United States Patent
Steele (10) Patent No.: US 9,896,926 B2
(45) Date of Patent: Feb. 20, 2018

(54) INTELLIGENT CEMENT WIPER PLUGS AND CASING COLLARS

(71) Applicant: Halliburton Energy Services, Inc., Houston, TX (US)

(72) Inventor: David Joe Steele, Arlington, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 572 days.

(21) Appl. No.: 14/382,623

(22) PCT Filed: Sep. 26, 2013

(86) PCT No.: PCT/US2013/061785
§ 371 (c)(1),
(2) Date: Sep. 3, 2014

(87) PCT Pub. No.: WO2015/047259
PCT Pub. Date: Apr. 2, 2015

(65) Prior Publication Data
US 2016/0230533 A1 Aug. 11, 2016

(51) Int. Cl.
*E21B 33/14* (2006.01)
*E21B 47/00* (2012.01)
(Continued)

(52) U.S. Cl.
CPC .......... *E21B 47/0005* (2013.01); *E21B 17/00* (2013.01); *E21B 21/08* (2013.01);
(Continued)

(58) Field of Classification Search
CPC ...................................................... E21B 33/16
See application file for complete search history.

(56) References Cited

U.S. PATENT DOCUMENTS

| 4,323,991 A | 4/1982 | Holmes et al. |
| 5,190,114 A * | 3/1993 | Walter ...................... E21B 7/18 166/177.7 |

(Continued)

FOREIGN PATENT DOCUMENTS

EP 2213831 A2 8/2010

OTHER PUBLICATIONS

International Search Report and Written Opinion for PCT/US2013/061785 dated Jun. 23, 2014.
(Continued)

*Primary Examiner* — Robert E Fuller
*Assistant Examiner* — Steven A MacDonald
(74) *Attorney, Agent, or Firm* — McDermott Will & Emery LLP (57) ABSTRACT

Disclosed are intelligent casing collars and cement wiper plugs used in wellbore cementing operations. A disclosed well system includes a casing string extending from a surface location within a wellbore, an annulus being defined between the casing string and the wellbore, a casing collar included in the casing string and having one or more sensors configured to measure at least one fluid property of a fluid present within the annulus, a cement wiper plug arranged within the casing string and communicably coupled to the casing collar such that measurement data obtained by the one or more sensors is conveyed to and received by the cement wiper plug, and a pulser associated with the cement wiper plug and configured to transmit pressure pulses to the surface location, wherein the pressure pulses correspond to the measurement data received from the one or more sensors.

21 Claims, 3 Drawing Sheets

(51) Int. Cl.
*E21B 33/16* (2006.01)
*E21B 47/10* (2012.01)
*E21B 47/18* (2012.01)
*E21B 17/00* (2006.01)
*E21B 21/08* (2006.01)
*E21B 33/12* (2006.01)
*E21B 47/06* (2012.01)
*E21B 47/12* (2012.01)
*G01V 1/22* (2006.01)

(52) U.S. Cl.
CPC ............. *E21B 33/12* (2013.01); *E21B 33/14* (2013.01); *E21B 33/16* (2013.01); *E21B 47/0006* (2013.01); *E21B 47/06* (2013.01); *E21B 47/065* (2013.01); *E21B 47/10* (2013.01); *E21B 47/12* (2013.01); *E21B 47/18* (2013.01); *G01V 1/22* (2013.01)

(56) References Cited

U.S. PATENT DOCUMENTS

| | | |
|---|---|---|
| 6,429,784 B1 | 8/2002 | Beique et al. |
| 7,327,634 B2 | 2/2008 | Perry et al. |
| 2002/0157828 A1 | 10/2002 | King et al. |
| 2003/0062155 A1* | 4/2003 | Summers ................. E21B 33/16 166/66 |
| 2004/0060697 A1 | 4/2004 | Tilton et al. |
| 2007/0000692 A1 | 1/2007 | Shah |
| 2008/0239872 A1 | 10/2008 | Miller et al. |
| 2008/0272931 A1* | 11/2008 | Auzerais ................. E21B 33/16 340/854.7 |
| 2010/0218951 A1* | 9/2010 | Harris ..................... E21B 7/068 166/290 |
| 2011/0114333 A1* | 5/2011 | Fenton .................... E21B 34/08 166/373 |
| 2011/0186290 A1* | 8/2011 | Roddy ..................... E21B 43/25 166/253.1 |
| 2012/0000655 A1 | 1/2012 | James et al. |

OTHER PUBLICATIONS

Search Report and Written Opinion received in corresponding Singapore Application No. 11201601170T, dated Aug. 18, 2016.
Patent Examination Report No. 2 received in corresponding Australian Application No. 2013402083, dated Sep. 30, 2016.

* cited by examiner

INTELLIGENT CEMENT WIPER PLUGS AND CASING COLLARS

BACKGROUND

The present disclosure is related to wellbore operations and, more particularly, to intelligent casing collars and cement wiper plugs used in wellbore cementing operations.

During completion of oil and gas wells, cement is often used to solidify a well casing within the newly drilled wellbore. To accomplish this, cement slurry is first pumped through the inner bore of the well casing and either out its distal end or through one or more ports defined in the well casing at predetermined locations. Cement slurry exits the well casing into the annulus formed between the well casing and the wellbore, and is then pumped back up toward the surface within the annulus. Once the cement hardens, it forms a seal between the well casing and the wellbore to protect oil producing zones and non-oil producing zones from contamination. In addition, the cement bonds the casing to the surrounding rock formation, thereby providing support and strength to the casing and also preventing blowouts and protecting the casing from corrosion.

Prior to cementing, the wellbore and the well casing are typically filled with drilling fluid or mud. A cementing plug is then pumped ahead of the cement slurry in order to prevent mixing of the drilling mud already present within the wellbore with the cement slurry. When the cementing plug reaches a float collar or cement plug arranged within the casing at a predetermined location, the hydraulic pressure of the cement slurry ruptures the cement plug and enables the cement slurry to pass through the plug and then through either the distal end of the casing or the side ports and into the annulus. Subsequently, another cementing plug is pumped down the casing to prevent mixing of the cement slurry with additional drilling mud that will be pumped into the casing following the cement slurry. When the top cementing plug lands on the casing collar or the cement plug, the pumping of the cement slurry ceases.

Prior to, during, and following the cementing operation, it may prove advantageous to monitor and transmit various wellbore parameters relating to the cementing operation to ensure that operations are proceeding and completed as designed.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to wellbore operations and, more particularly, to intelligent casing collars and cement wiper plugs used in wellbore cementing operations.

The exemplary casing collars and cement wiper plugs described in the present disclosure are embedded with electronic and/or mechanical devices that provide each component with intelligence and communication capabilities (both transmitting and receiving). In operation, the exemplary casing collars may be configured to monitor fluids, such as drilling fluids, spacer fluids and cement slurries, flowing within an annulus defined between the casing string and the walls of the wellbore. For instance, the casing collars may have multiple sensors configured to detect various parameters related to the fluids and transmit these measurements to the exemplary cement wiper plug. The cement wiper plug may include a pulser, such as a mud pulser, that is able to communicate with the surface through pressure pulses conveyed through the fluid column in the casing string, and thereby transmit the measurement data obtained from the sensors to a surface location. The disclosed embodiments may prove advantageous in providing a well operator with real-time data regarding cementing operations downhole.

Figure 1:
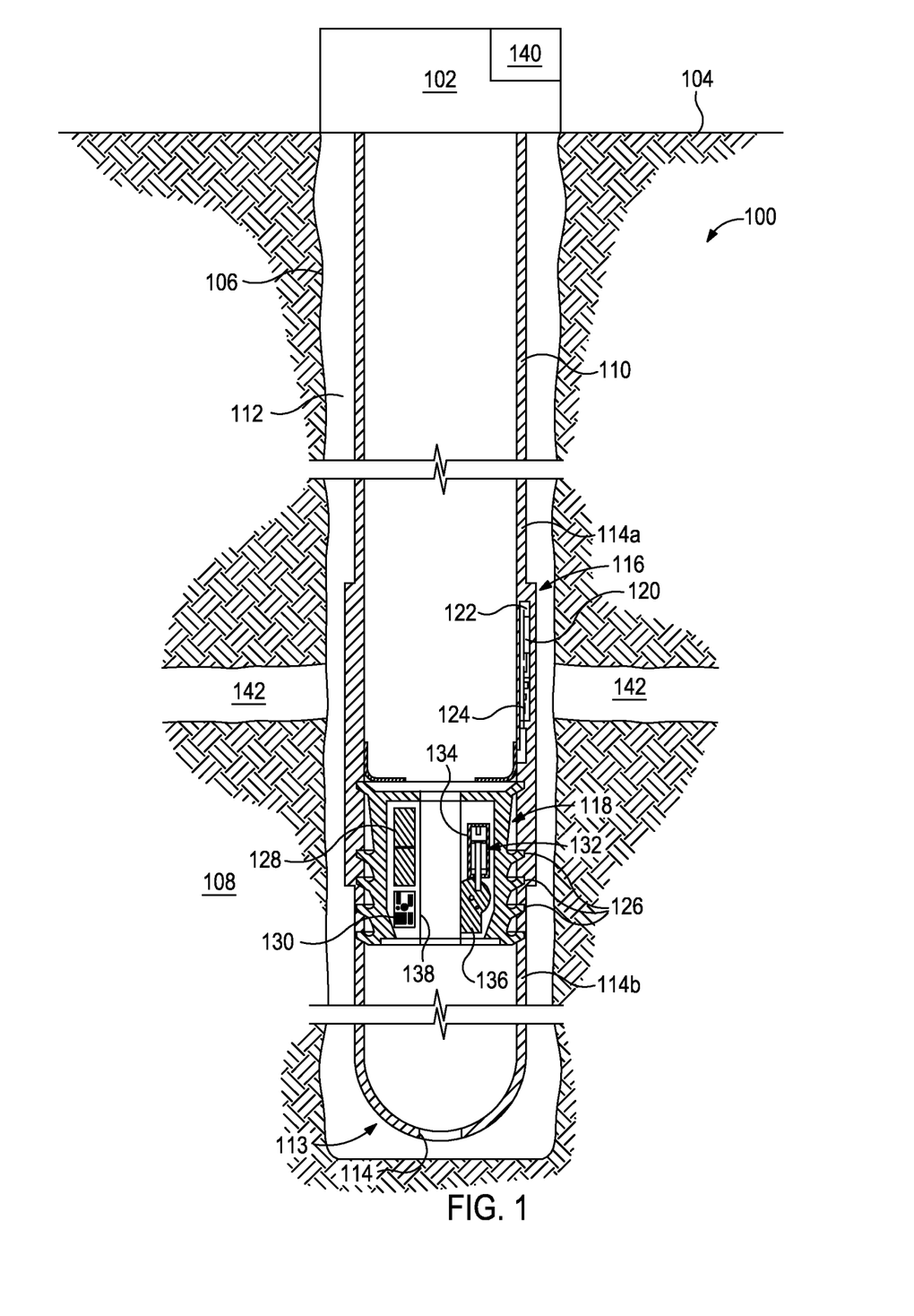
FIG. 1 is an exemplary well system that may employ the principles of the present disclosure, according to one or more embodiments.

Referring to FIG. 1, illustrated is an exemplary well system 100 that may employ the principles of the present disclosure, according to one or more embodiments. The well system 100 may include an oil and gas rig 102 arranged at the Earth's surface 104 and a wellbore 106 extending therefrom and penetrating a subterranean earth formation 108. As depicted in FIG. 1, the rig 102 may be representative of any type of wellbore drilling or servicing rig including, but not limited to, land-based oil and gas rigs, offshore platforms, offshore service rigs, and any wellhead installation known to those skilled in the art. Accordingly, the surface 104 may be representative of the sea level in offshore applications.

As illustrated, the wellbore 106 may extend substantially vertically away from the surface 104. In other embodiments, the wellbore 106 may otherwise deviate at any angle from the surface 104 over a deviated or horizontal portion. In other applications, portions or substantially all of the wellbore 106 may be vertical, deviated, horizontal, and/or curved. Moreover, use of directional terms such as above, below, upper, lower, upward, downward, uphole, downhole, and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the bottom of the well.

As illustrated, a casing string 110 may be extended within the wellbore 106 from the surface 104, thereby defining an annulus 112 between the walls of the wellbore 106 and the casing string 110. As used herein, the term "casing string" refers to one or more types of connected lengths of tubulars or pipe. In some embodiments, "casing string" refers to the common meaning of casing as used by those skilled in the art. In other embodiments, however, "casing string" may refer to surface casing, intermediate casing, production tubing, wellbore liner, combinations thereof, or the like. A float shoe 113 may be arranged at the bottom or distal end of the casing string 110. The float shoe 113 may include or otherwise define at least one hole 114 therein configured to provide fluid communication between the annulus 112 and the interior of the casing string 110. In some embodiments, an integral check valve (not shown) may be arranged within the hole 114 and used to prevent reverse flow or "U-tubing" of various fluids into the casing string 110 from the annulus 112 during operation.

The well system 100 may further include a casing collar 116 and a cement wiper plug 118. The casing collar 116 may be arranged about or otherwise form an integral part of the casing string 110. The casing collar 116 may generally be used to connect two axially adjacent sections or joints of the casing string 110, shown as an upper casing section 114a and a lower casing section 114b. Moreover, however, the casing collar 116 may be embedded with various electronic and/or mechanical devices configured to provide the casing collar 116 with intelligence and communication capabilities.

For instance, the casing collar 116 may include one or more sensors 120 (one shown) arranged within a cavity 122 defined in the casing collar 116. While only one sensor 120 is shown in FIG. 1, it will be appreciated that more than one sensor 120 may be employed in the casing collar 116, without departing from the scope of the disclosure. In some embodiments, for example, several sensors 120 may be arranged within the cavity 122. In other embodiments, multiple sensors 120 may be arranged about the circumference of the casing collar 116, as will be described in greater detail below.

The sensors 120 may be configured to monitor or otherwise measure various wellbore parameters, such as properties of fluids that may be present within the annulus 112. Accordingly, the sensors 120 may include a variety of different sensors including, but not limited to, temperature sensors (measurements taken in both inner and outer diameters), pressure sensors (measurements taken in both inner and outer diameters), one or more strain gauges or sensors (i.e., to measure weight, tension, compression, bending moment, etc.), pH sensors, density sensors, viscosity sensors, chemical composition sensors (e.g., sensors capable of determining the chemical makeup of fluids and otherwise capable of comparing chemical compositions of different fluids), radioactive sensors (e.g., gamma, neutron, and proton), sonic emitters and receivers, resistivity sensors, sonic or acoustic sensors, self/spontaneous potential sensors, mechanical sensors (e.g., caliper logs and the like), nuclear magnetic resonance logging sensors, and the like.

A communications module 124 may also be arranged within the cavity 122 of the casing collar 116. The communications module 124 may include one or more of a receiver, a transmitter, a transceiver, a power source, a computer, and a memory storage device. In some embodiments, the memory storage device may be sealed or substantially sealed (e.g., one or more fluid and/or pressure barriers) from the fluids from the surrounding environment in order to protect fragile electrical components associated therewith. The communications module 124 may be configured to receive the measurements obtained from the sensors 120 in real-time. In some embodiments, the measurement signals from the sensors 120 may be stored in the associated memory storage device. In other embodiments, however, the measurement signals from the sensors 120 may be conveyed or otherwise transmitted (either wired or wirelessly) to the cement wiper plug 118, as will be discussed in more detail below.

The cement wiper plug 118 may be arranged within the casing string 110 at or near the casing collar 116. The casing collar 116 may be communicably coupled to the cement wiper plug 118 such that it is able to transmit measurement data thereto. In some embodiments, the cement wiper plug 118 may be run in hole from the surface 104 at the same time the casing string 110 is conveyed downhole. In other words, in some embodiments, the cement wiper plug 118 may be mechanically and electrically coupled to the interior of the casing string 110 and otherwise form an integral part thereof. In other embodiments, however, the cement wiper plug 118 may be conveyed downhole once the casing string 110 is landed or otherwise situated within the wellbore 106. In such embodiments, the blades or wipers 126 of the cement wiper plug 118 may be configured to locate a corresponding profile or groove defined on the inner radial surface of the casing string 110 and thereby secure itself therein. Once properly secured within the casing string 110, the cement wiper plug 118 may become mechanically and electrically coupled thereto.

The cement wiper plug 118 may include a power source 128, computer hardware 130, and a pulser 132. The power source 128 may be any device or mechanism capable of providing power to the computer hardware 130 and the pulser 132. In some embodiments, the power source 128 may also provide power to the casing collar 116 and its associated components described above. The power source 128 may be one or more batteries or fuel cells, such as alkaline or lithium batteries. In other embodiments, the power source 128 may be a terminal portion of an electrical line (i.e., e-line) extending from the surface 104. In yet other embodiments, the power source 128 may encompass power or energy derived from a downhole power generation unit or assembly, as known to those skilled in the art.

The computer hardware 130 may be configured to implement the various methods described herein and can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, the computer hardware 130 can further include elements such as a memory (e.g., random access memory (RAM), flash memory, read only memory (ROM), programmable read only memory (PROM), electrically erasable programmable read only memory (EEPROM)), registers, hard disks, removable disks, CD-ROMS, DVDs, or any other like suitable storage device or medium.

The computer hardware 130 may be communicably coupled to the pulser 132 such that the computer hardware 130 is able to control or otherwise actuate the pulser 132 upon command. As illustrated, the pulser 132 may be a mud pulser and may include an actuator 134 and a rocker arm 136 operatively coupled to the actuator 134 such that movement of the actuator 134 correspondingly moves the rocker arm 136. The actuator 134 may be any type of actuating device including, but not limited to, a mechanical actuator, an electromechanical actuator, a hydraulic actuator, a pneumatic actuator, combinations thereof, and the like.

The rocker arm 136 may be pivotably coupled to the actuator 134 such that when the actuator 134 is actuated, the rocker arm 136 pivots into a flow path 138 centrally defined within the cement wiper plug 118. As it pivots into the flow path 138, the rocker arm 136 at least partially occludes the flow path 138 and is thereby able to transmit pressure pulses to the surface 104 via the fluid column present within the interior of the casing string 110. At the surface 104, the pressure pulses are received by one or more sensors of a computer system 140 arranged on the rig 102 and converted into an amplitude or frequency modulated pattern of fluid pulses. The pattern of fluid pulses may then be translated by the computer system 140 into specific information or data transmitted by the computer hardware 130 of the pulser 132.

It will be appreciated by those skilled in the art that while the pulser 132 is depicted in FIG. 1 as including a specific design and configuration including the actuator 134 and the rocker arm 136, several variations of the pulser 132 may be employed to equally accomplish the same end, without departing from the scope of the disclosure. Indeed, various other types and designs of pulsers, including other types besides mud pulsers, are readily available and also capable of transmitting pressure pulses to the surface 104 via the fluid column within the casing string 110. Accordingly, the pulser 132 is shown and described herein as merely illustrative and therefore should not be considered limiting to the present disclosure.

Moreover, in other embodiments, the communications module 124 may be configured to transmit information to/from the computer system 140 at the surface 104. For instance, in at least one embodiment, the communications module 124 may be capable of real-time acoustic telemetry with the computer system 140 which may be associated with an electronic acoustic receiver attached to the top drive on the rig 102. The acoustic signal may be transmitted via several repeaters or "nodes" positioned at pre-determined locations within the casing string 110 to provide optimum signal strength and transmission speed, depending upon the angle of the hole. The nodes are a collar-based design utilizing an outer housing with an internal mandrel providing space between for batteries, sensors, electronic boards and a piezoelectric stack used to transmit the acoustic signals. In some embodiments, the nodes can be approximately the same length as drill pipe and utilize the same threads as drill string tool joints.

The computer system 140 may be configured to receive the acoustic signals and transmit any received signals to a decoding center. Following decoding, the signal may be transmitted to a number of locations dependent upon the operator's preference. The decoded data may also be displayed in graphic form, thereby allowing the operator to see even small changes in the downhole environment. Alternatively, this data can be held in memory until tripped out of the hole, thereby also providing along-string measurements of downhole events. Because of its potentially high data rate, those skilled in the art will appreciate the advantages of using acoustic telemetry. For instance, the operating frequency band of acoustic telemetry is much higher and broader than mud pulse, ranging from 400 Hz to 2 KHz. Moreover, acoustic telemetry operates in virtually any drilling or completions environment since it is independent of fluid flow and is not restricted by high-resistivity formations. This makes using acoustic telemetry well suited for providing pressure data visibility in under-balance drilling or managed-pressure drilling applications.

The casing collar 116 may be arranged in the wellbore 106 such that the sensors 120 are disposed at or above a critical zone 142 defined within the subterranean formation 108. The critical zone 142 may be a zone of interest that may include certain fluids or chemicals that a well operator may want to restrict through a cementing operation within the annulus 112. For instance, the critical zone 142 may include corrosive fluids or chemicals that may corrode the casing string 110 if not properly sealed. In other embodiments, the critical zone 142 may be a hydrocarbon-producing zone that the well operator would like to also seal off such that hydrocarbons do not leak into the annulus 112 but instead may be intelligently produced to the surface.

Figure 2A:
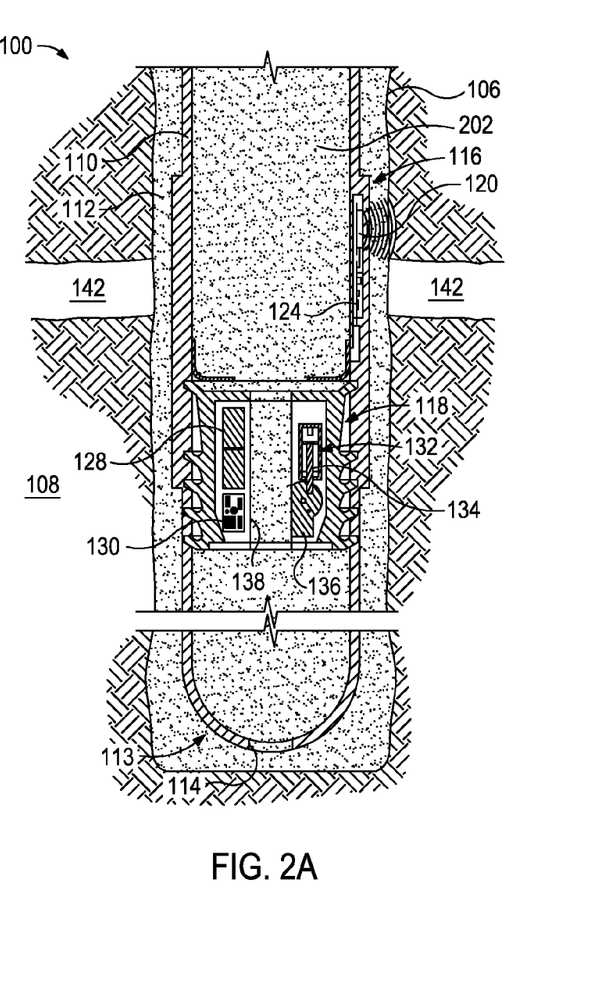
FIGS. 2A and 2B illustrate the well system of FIG. 1 in exemplary operation, according to one or more embodiments.

Referring now to FIGS. 2A and 2B, illustrated is the well system 100 of FIG. 1 in exemplary operation, according to one or more embodiments. In FIG. 2A, a drilling fluid 202 or "mud" may be disposed within the casing string 110. More particularly, the drilling fluid 202 may be circulated through the wellbore 106 from the surface 104 (FIG. 1) by flowing down through the interior of the casing string 110 and also through the flow path 138 defined within the cement wiper plug 118. At the bottom of the casing string 110, the drilling fluid 202 exits into the annulus 112 via the float shoe 113 and is then pumped back up toward the surface 104 within the annulus 112. As mentioned above, the check valve (not shown) may be arranged within the hole 114 to prevent reverse flow of the drilling fluid 202 back into the casing string 110 from the annulus 112.

While the drilling fluid 202 is circulated through the wellbore 106, the sensors 120 may be monitoring the drilling fluid 202. In some embodiments, measurements are taken continuously by the sensors 120. In other embodiments, measurement are taken at predetermined times or otherwise intermittently by the sensors 120. The measurements taken by the sensors 120 may include, but are not limited to, pressure, temperature, density of the drilling fluid 202, chemical composition of the drilling fluid 202, gas-cut of the drilling fluid 202 (e.g., how much gas is entrained in the drilling fluid 202), and the presence of oil and/or gas within the drilling fluid 202.

Monitoring the presence of oil, water (e.g., formation water, hard water, saltwater, fresh water), emulsions of oil and water, other formation fluids (i.e., paraffins, waxes, light oils, etc.), and/or gas within the drilling fluid 202 may help ensure that the wellbore 106 is sufficiently stable for a cementing operation. More particularly, such measurements may provide a well operator with the hydrostatic head pressure within the annulus 112 to ensure that the pore pressure of the formation 108 is at least slightly lower than the hydrostatic head such that the influx of oil, water, and/or gas or toxic chemicals into the annulus 112 is generally prevented. Water from formations can lighten the weight of the drilling fluid 202 also. If the hydrostatic head is reduced, more oil, water and/or gas can flow into the wellbore 106 and thereby lighten the weight of the drilling fluid 202 to a greater extent. Well control issues can occur if the weight of the drilling fluid 202 is lightened too much.

In at least some embodiments, the measurements obtained by the sensors 120 may be conveyed to the cement wiper plug 118 in real-time, and the computer hardware 130 may be configured to receive and process these measurements. In some embodiments, the computer hardware 130 may be configured to store the pre-processed or processed measurements. In other embodiments, the computer hardware 130 may be configured to translate the processed measurements into a command signal transmitted to the pulser 132.

Figure 2B:
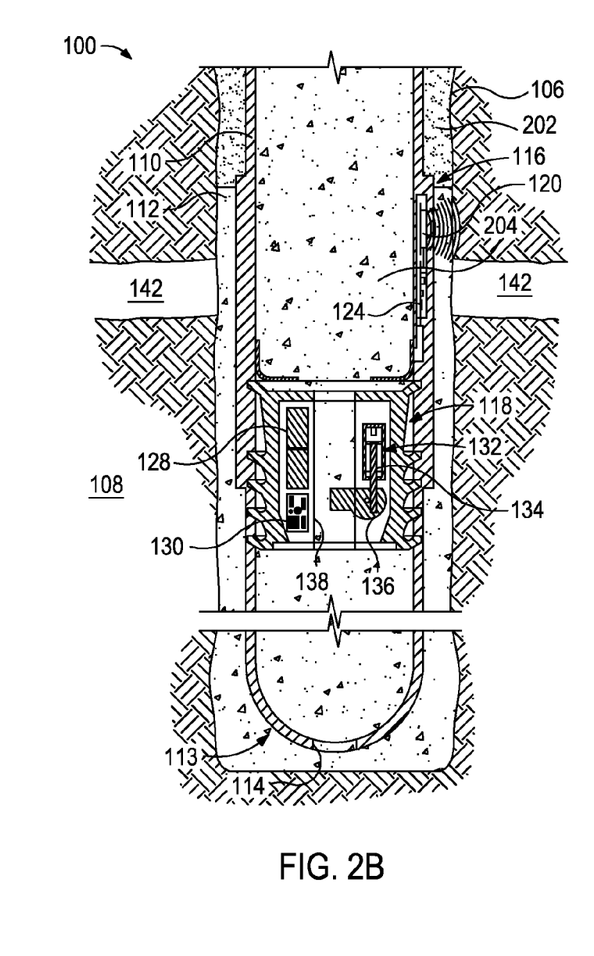

The command signal may be received by the pulser 132 and serve to actuate the pulser 132 such that the rocker arm 136 is engaged to partially occlude the flow path 138 and thereby transmit pressure pulses to the surface 104 (FIG. 1) via the fluid column present within the casing string 110. Actuation of the pulser 132 is shown in FIG. 2B. At the surface 104, the pressure pulses may be received by the computer system 140 (FIG. 1), such as with one or more surface sensors, and retranslated back into the measurement data such that the well operator may be apprised of the parameters of the drilling fluid 202 being measured downhole.

Referring to FIG. 2B, a spacer fluid 204 may be pumped into the casing string 110 and otherwise circulated through the wellbore 106 following the drilling fluid 202. As illustrated, the spacer fluid 204 has been pumped through the casing string 110, exited the bottom of the casing string 110 at the float shoe 113, and is returning to the surface 104 via the annulus 112. The spacer fluid 204 may follow the drilling fluid 202 and otherwise hydraulically push the drilling fluid 202 back to the surface 104 as it advances through the wellbore 106.

The spacer fluid 204 may be any fluid that is different from the drilling fluid 202 including, but not limited to, freshwater, brines, and slurries that include materials, chemicals and additives blended together at engineered concentrations. In some embodiments, the spacer fluid 204 may be a "plug" or a "pill" of the spacer fluid 204, meaning that the spacer fluid 204 encompasses a predetermined volume, such as around 20 barrels or more. The plug of spacer fluid 204 may follow the drilling fluid 202 and otherwise serve to separate the drilling fluid 202 from another fluid, such as a concrete slurry to be circulated through the wellbore 106 following the spacer fluid 204.

According to some embodiments, the sensors 120 may be configured to detect or otherwise sense when the spacer fluid 204 passes the sensors 120, thereby enabling a well operator to determine the volume of cement slurry required to be pumped to cover or otherwise seal the critical zone 142. More particularly, the sensors 120 may be configured to measure a fluid property corresponding to the drilling fluid 202 in the annulus 112. The fluid property being monitored may include, but is not limited to, density, viscosity, pH level, chemical composition (e.g., acetylene gas concentration), yield stress, shear sensitivity, flow rate, radioactivity (e.g., in the case of radioactive tracers), salinity, alkalinity, oil-cut, presence of oil, fluid loss, combinations thereof, and the like. Once the fluid property being measured changes or otherwise becomes a fluid property corresponding to the spacer fluid 204, the communications module 124 may communicate the same to the cement wiper plug 118, which transmits this information to the surface 104 via the pulser 132. Given a known flow rate of the spacer fluid 204 being pumped from the surface 104, in conjunction with the timing required for the measured fluid property to switch from the drilling fluid 202 to the spacer fluid 204, a well operator may be able to determine or otherwise calculate how much cement is needed to surpass the critical zone 142 within the annulus 112.

In some embodiments, pumping of the spacer fluid 204 may be stopped once the spacer fluid 204 reaches or otherwise surpasses the sensors 120 within the annulus 112. While pumping is stopped, the sensors 120 may be configured to monitor the pressure within the annulus 112 to determine if fluids are falling into "loss zones" via vugs, fissures, fractures or other permeabilites in the surrounding formation 108 or critical zone 142. If the pressure within the annulus 112 drops, this may be an indication that fluids are being lost into loss zones of the formation 108. As will be appreciated, this may prove advantageous in determining if the hydrostatic head within the annulus 112 is greater/heavier than what the formation 108 can withstand, and therefore may be an indication as to whether cement would also be lost into the formation 108 during cementing. Any measured pressure decrease may be transmitted to the surface 104 via the cement wiper plug 118 and the pulser 132, and the well operator may be able to determine how much hydrostatic pressure the formation 108 can hold and therefore how much extra cement slurry will need to be pumped to appropriately seal the wellbore 106.

Moreover, in response to the data transmitted to the surface 104, one or more properties of the cement slurry and/or the spacer fluid 204 can be modified to enhance/improve the quality of a subsequent cementing job. For example, the weight of the cement slurry may be increased if the formation pressure is greater than anticipated. As will be appreciated, increasing the weight of the cement slurry may help prevent formation fluids from encroaching into the wellbore 106 and migrating upwards by creating micro annuli.

In some embodiments, two casing collars 116 (not shown) may be arranged on either side of a critical zone 142 (i.e., axially above and below the critical zone 142). Once the spacer fluid 204 is sensed or otherwise detected by the lower casing collar (e.g., time=$T_1$), a pulse may be sent to the surface 104 providing positive indication that the spacer fluid 204 has been sensed. After a time, the spacer fluid 204 may be sensed or otherwise detected by the upper casing collar (e.g., time=$T_2=T_1+\Delta T_1$), and another pulse may be sent to the surface 104 providing positive indication that the spacer fluid 204 has been sensed at the upper casing collar. By knowing the volume of the wellbore 106 between the lower and upper casing collars, and by pumping at a constant rate, the time for the pill of the spacer fluid 204 to reach each casing collar can be calculated.

If the actual time is longer than calculated, then it can be surmised that some of the fluid is being lost, for example, by seeping into the critical zone 142, which may be a low pore-fracture pressure zone. If the hydrostatic head pressure is greater than the pressure in the critical zone 142, the spacer fluid 204 will "fall" downhole and enter the critical zone 142. During this time, both casing collars may be recording the activity. For instance, the upper casing collar may detect an increase in the property being measured with the sensors 120 (e.g., radioactivity), and then a decrease as the pill passes thereby. If the pill moves into the critical zone 142, then the lower casing collar will not sense a change in the property being measured. The time when the upper casing collar first senses the spacer fluid 204 moving down past it and when the property being measured drops to a magnitude indicating that the majority of the pill has fallen past the upper casing collar may be useful in providing a means for estimating how fast the critical zone 142 is taking the pill.

The hydrostatic pressure at the upper casing collar may also be used to determine the hydrostatic head and pressure of the critical zone 142. If the critical zone 142 is not taking fluid, for example, the hydrostatic head will be calculated. If the critical zone 142 is taking fluid, however, the pore-fracture pressure of the critical zone 142 may be measured using the sensors 120. It will be appreciated that multiple pills or slugs (or repeats thereof) of the spacer fluid 204 may be pumped in order to check for losses into the critical zone 142.

In some embodiments, the sensors 120 may be configured to monitor the annulus 112 for a cement slurry (not shown) pumped from the surface 104 following the spacer fluid 204 and configured to seal the wellbore 106 or otherwise cover the critical zone 142. For example, the sensors 120 may be configured to monitor a fluid property of the cement slurry, such as density, viscosity, pH level, chemical composition, combinations thereof, and the like. As soon as the cement slurry is detected by the sensors 120, the communications module 124 may communicate the same to the cement wiper plug 118 and the information may be transmitted to the surface 104 via the pulser 132. Knowing when the cement slurry has passed the sensors 120 may prove advantageous in providing a positive indication to the well operator that the critical zone 142 has indeed been covered or otherwise surpassed with the cement slurry.

In some embodiments, the sensors 120 may be configured to continuously monitor the fluid properties of the cement slurry within the annulus 112 as the cement is circulated within the wellbore 106. Fluid properties such as density, viscosity, and pH may be especially important parameters to monitor as they may correspond to the overall quality of the cement placed in the annulus 112. Knowing the quality of the cement may prove advantageous in providing assurances of its robustness and ability to properly seal the wellbore 106. In embodiments where the cement slurry is foam cement being circulated through the wellbore 106 and used to seal the annulus 112, the sensors 120 may be used to measure the quantity and/or quality of the gas suspended in the foam cement. For instance, the sensors 120 may be configured to monitor or measure the density of the foam cement and report the same to the surface 104.

In some embodiments, the amount of measurement data recovered may be too much to transmit with the cement wiper plug 118 while circulating and cementing the casing string 110. In such embodiments, another option for data retrieval would be to retrieve the cement wiper plug 118 (or just the data) from the wellbore 106 following the cementing job. This may be accomplished using, for example, wireline or slickline as extended from the surface 104 (FIG. 1). Once the cement wiper plug 118 is retrieved to the surface 104, the measurement data stored in the memory associated with the computer hardware 130 may be downloaded for processing and post-job analysis. In yet other embodiments, the measurement data may be conveyed to the surface 104 using a combination of data transmission via the cement wiper plug 118 while downhole and also retrieving part (or all) of the cement wiper plug 118 to the surface 104.

In yet other embodiments, the measurement data obtained by the sensors 120 may be retained in the memory associated with the communications module 124. In order to obtain such stored measurement data, a drill string including an associated bottom hole assembly (BHA) (not shown) may be introduced into the wellbore 106 as it is being tripped in to continue drilling operations below the bottom of the casing string 110. The measurement data stored in the communications module 124 may be transferred wirelessly to the BHA as it passes the casing collar 116. The transmitters and receivers associated with each component may send and receive radio frequency (RF) signals, infrared (IR) frequency signals, or other electromagnetic signals. Any of a variety of modulation techniques may be used to modulate data on a respective electromagnetic carrier wave or acoustic carrier wave or other energy source/receiver.

The retrieved data may then be transmitted to the surface 104 via mud pulse telemetry associated with the BHA or via wired drill pipe. In other embodiments, the data retrieved by the BHA may instead be stored in a memory associated with the BHA for recovery when the BHA is tripped out of the wellbore 106. In yet other embodiments, the retrieved data may be stored in the memory associated with the BHA until drilling is commenced at which point the data may be transmitted to the surface 104 via mud pulse or other telemetry methods, such as acoustic telemetry. As will be appreciated, running the BHA past the casing collar 116 may also allow charging of any power storage devices (not shown) associated therewith, such as via induction charging techniques. Thus allowing additional sensor data to be acquired, stored, computed and transmitted at a later date (e.g., up to the end of the life of the well or longer).

Figures 3, 4:
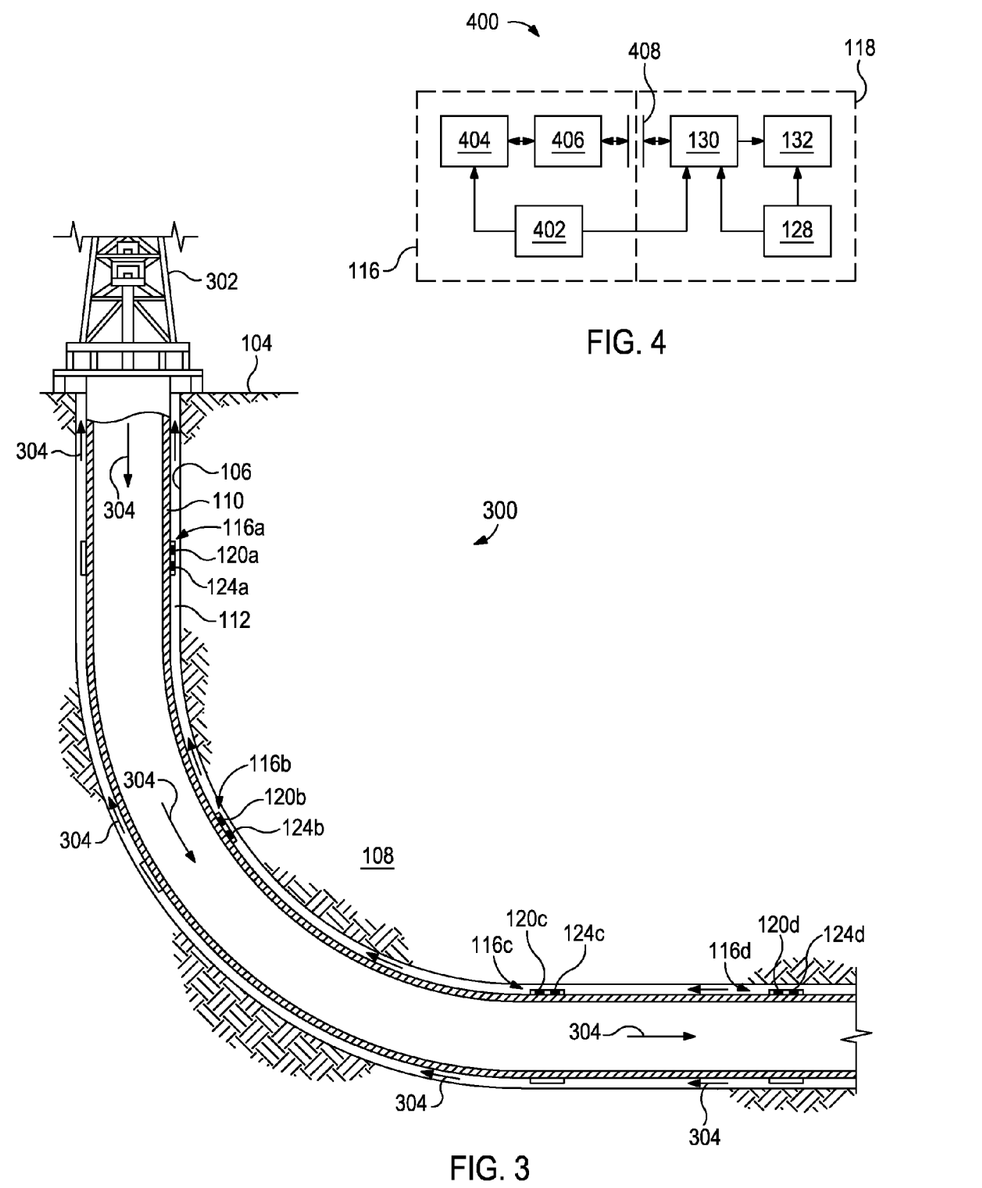
FIG. 3 illustrates another exemplary well system that may employ the principles of the present disclosure, according to one or more embodiments.
FIG. 4 illustrates an exemplary intelligence system that may exemplary intelligence system used to measure orientation of a casing string, according to one or more embodiments.

Referring now to FIG. 3, with continued reference to the preceding figures, illustrated is another exemplary well system 300 that may employ the principles of the present disclosure, according to one or more embodiments. The well system 300 may be similar in some respects to the well system 100 of FIG. 1 and therefore may be best understood with reference thereto, where like numerals represent like elements not described again in detail. The well system 300 may include an oil and gas rig 302 arranged at the Earth's surface 104 and the wellbore 106 extends therefrom and penetrates the subterranean earth formation 108. The casing string 110 is depicted as extending from the rig 302 and into the wellbore 106, thereby defining the annulus 112 therebetween. As depicted, a fluid 304 may be introduced into the wellbore 106 via the casing string 110 and return to the surface 104 via the annulus 112, as generally described above. The fluid 304 may be representative of the drilling mud 202 or the spacer fluid 204 of FIGS. 2A-2B, but may also be representative of a cement slurry used to cement the casing string 110 within the wellbore 106.

While depicting a land-based service rig in FIG. 3, the rig 302 may equally be replaced with any other type of wellbore rig including, but not limited to, offshore platforms, offshore service rigs, and any wellhead installation (used for construction, drilling, completing, producing, servicing, stimulating, etc.) known to those skilled in the art. Accordingly, the surface 104 may equally be representative of the sea level in offshore applications.

The well system 300 may include a plurality of casing collars 116 (shown as casing collars 116a, 116b, 116c, and 116d) arranged in or otherwise forming an integral part of the casing string 110 at predetermined locations along the length of the casing string 110. Similar to the casing collar 116 of FIG. 1, one or more of the casing collars 116a-d may be embedded with various electronic and/or mechanical devices configured to provide the corresponding casing collar 116a-d with intelligence and communication capabilities. In some embodiments, one or more of the casing collars 116a-d may further include energy storage capabilities and/or an independent power supply. In at least one embodiment, one or more of the casing collars 116a-d may also include a means of recharging the energy/power supply (i.e., rechargeable batteries), as generally described above.

In some embodiments, for example, one or more of the casing collars 116a-d may include sensors 120 (shown as sensors 120a, 120b, 120c, and 120d). Similar to the sensors 120 of FIG. 1, the sensors 120a-d may be configured to monitor or otherwise measure properties of fluids (e.g., the fluid 304) that may be present within the annulus 112. Accordingly, the sensors 120a-d may encompass a variety of different sensors including, but not limited to, temperature sensors, pressure sensors, pH sensors, density sensors, viscosity sensors, chemical composition sensors, and the like.

Moreover, one or more of the casing collars 116a-d may further include a communications module 124 (shown as communications modules 124a, 124b, 124c, and 124d) associated therewith. Similar to the communications module 124 of FIG. 1, the communications modules 124a-d may each include one or more of a receiver, a transmitter, a transceiver, a power source, timers, counters, and a memory storage device. The communications modules 124a-d may be configured to receive the measurements obtained from the sensors 120a-d in real-time. In some embodiments, the measurement signals from the sensors 120a-d may be stored in the associated memory storage device. In other embodiments, however, the measurement signals from the sensors 120a-d may be conveyed or otherwise transmitted (either wired or wirelessly) to the surface 104 for processing and consideration by a well operator.

While only four casing collars 116a-d are shown in FIG. 3, it will be appreciated that more or less than four casing collars 116a-d and associated sensors 120a-d may be employed, without departing from the scope of the disclosure. Moreover, while not depicted in FIG. 3, one or more of the casing collars 116a-d may include an associated one or more cement wiper plugs 118 arranged within the casing string 110 at or near the particular casing collar 116a-d. Operation of such a cement wiper plug 118 in conjunction with the associated casing collar 116a-d may proceed as generally described above with reference to FIGS. 2A-2B and therefore will not be described again. As the casing string 110 is being lowered into the wellbore 106, each of the casing collars 116a-d may be active and otherwise monitoring various wellbore parameters such as, but not limited to, hole diameter, temperature, pressure, pH, radioactivity, etc.

In some embodiments, the sensors 120a-d in one or more of the casing collars 116a-d may be spaced about the circumference of the casing string 110. For example, and not by limitation, the third casing collar 116c may include multiple sensors 120c (only one shown) spaced either equidistantly or randomly around the circumference of the casing string 110 at that location within the wellbore 106. As a result, the sensors 120c may be able to monitor fluid properties of the fluid 304 within the annulus 112 at a corresponding plurality of angles about the casing string 110. The monitored or measured fluid properties may be transmitted (either wired or wirelessly) to the surface 104 using the communications module 124c. In other embodiments, however, an associated cement wiper plug (not shown) may be arranged within the casing string 110 adjacent the third casing collar 116c and may otherwise transmit the monitored or measured fluid properties obtained by the sensors 120c to the surface 104 as generally described herein. It will be appreciated that more than one cement wiper plug may be arranged within the casing string 110 adjacent the third casing collar 116c as well.

Such an embodiment may prove advantageous in monitoring the flow profile of the fluid 304 for micro-annuli that may potentially form in horizontal and/or deviated portions of the wellbore 106. For example, if not properly centralized, the casing string 110 within horizontal and/or deviated portions of the wellbore 106 may tend to lie on the low side of the wellbore 106. Upon encountering an improperly centralized casing string 110, the fluid 304 may take the path of least resistance and flow to the high side of the wellbore 106 where a larger gap would exist. If one of the sensors 120c detects a flow profile (e.g., flow rate and/or pressure change (drop)) different from the other sensors 120c, such as by a predetermined amount, that may be an indication of a poorly placed or centralized casing string 110. During cementing operations, when the fluid 304 consists of a cement slurry, a poorly placed casing string 110 may result in micro-annulus formation between the casing string 110 and the walls of the wellbore 106. In such locations, the cement may be too thin on the low side of the wellbore 106 and therefore may be susceptible to failure. By detecting a poorly placed casing string 110 during circulating and conditioning of the wellbore 106 (e.g., the circulation that occurs before pumping spacers and cement), methods such as manipulating the casing string 110 and adding additives to the drilling fluid, spacer fluid, and/or cement slurry to improve the placement of the casing string 110 can be used.

Instead of transmitting the measurement data from the sensors 120a-c to the surface 104 in real-time via the corresponding communication modules 124a-d, in some embodiments the measurement data may be stored within the communication modules 124a-d and subsequently recovered for post-job analysis following a cementing operation. More particularly, after the cementing operation is finished, a logging tool or device (not shown) may be sent downhole into the casing string 110 on a conveyance such as, but not limited to, wireline, slickline, electrical line, drill pipe, production tubing, coiled tubing, and the like. The logging tool may be configured to download the measurement data from each communication module 124a-d as it passes thereby within the casing string 110.

In some embodiments, for example, the measurement data stored in the communications modules 124a-d may be transferred wirelessly to the logging tool as it passes the casing collars 116a-d. The transmitters and receivers associated with each component may send and receive radio frequency (RF) signals, infrared (IR) frequency signals, or other electromagnetic signals. Any of a variety of modulation techniques may be used to modulate data on a respective electromagnetic or acoustic (or other) carrier wave(s). Alternatively, wired communications (including fiber optics) may also be performed to transfer the stored data. Communications protocols for managing communication are known, and may include IEEE 802.11, IEEE 802.3, USB-compatible, Bluetooth, etc. Such downloaded measurement data may provide the well operator with the drilling fluid, spacer fluid, and cement fluid properties measured during the cementing job at each casing collar 116a-d location and the final cement properties at such locations within the wellbore 106.

In some embodiments, one or more of the casing collars 116a-d may be arranged above the expected top of cement within the annulus 112 and the associated sensors 120a-d may be configured to monitor pressure within the annulus 112 and/or the presence of hydrocarbons. In at least one embodiment, one or more of the casing collars 116a-d may be arranged just below a casing liner hanger (not shown), such as at the bottom of surface casing. Geothermal heat or heat emanating from formation fluids could expand the casing string 110 and/or the liner hanger and potentially damage or collapse the casing string 110 and/or the liner hanger. When the pressure within the annulus 112 exceeds a predetermined limit as detected by the associated sensors 120a-d, a port or check valve (not shown) associated with the casing collar 116a-d may be configured to open to allow the pressure to escape into the casing string 110 and thereby relieve the pressure buildup within the annulus 112. Once the pressure in the annulus 112 decreases past a critical level, the port or check valve may be configured to close once again.

Still referring to FIG. 3, but with continued reference to FIG. 1, in some embodiments, one or more of the casing collars 116a-d and/or an associated cement wiper plug 118 (FIG. 1) may be used to measure and report the angular orientation of various downhole equipment (not shown) associated with the casing string 110. Once the orientation of the downhole equipment is ascertained, such information may be transmitted to the surface 104 such that the downhole equipment may be oriented to a desired orientation within the wellbore 106. Exemplary downhole equipment that may be oriented within the wellbore 106 using the present disclosure may include, but are not limited to, pre-perforated liners, sand screens, pre-milled windows, tubing exit whipstock-like muleshoes, and mandrels (e.g., gas-lift mandrels, etc.).

The sensors 120a-d in one or more of the casing collars 116a-d may include, for example, various accelerometers or gyroscopes arranged therein and configured to provide orientation information for the casing string 110. In at least one embodiment, the sensors 120a-d used to measure orientation may be micro-electromechanical systems (MEMS), such as MEMS inertial sensors which may include various accelerometers, gyroscopes, and magnetometers. While the fluid 304 is being pumped or otherwise circulated within the wellbore 106, the casing collars 116a-d may be configured to monitor and report the orientation of the casing string 110.

In embodiments where an associated cement wiper plug 118 (FIG. 1) is used with the casing collars 116a-d, the orientation information may be fed to the cement wiper plug 118 which may transmit the information to the surface 104 via the pulser 132 (FIG. 1). In other embodiments, the communication modules 124a-d may be configured to transmit the orientation information to the surface 104 either wired or wirelessly. In response to receiving the orientation information, a well operator may adjust the rotational direction of the casing string 110 such that the downhole equipment at issue is rotationally oriented as desired.

Referring to FIG. 4, with continued reference to FIG. 1, illustrated is an exemplary intelligence system 400 that may be used to measure the orientation of the casing string 110, according to one or more embodiments. The intelligence system 400 may be used in conjunction with either the casing collar 116 or the cement wiper plug 118, or a combination of both. The intelligence system 400 may include a power supply 402 that may provide power to at least a 3-axis accelerometer 404. The accelerometer 404 may be in communication with a 3-axis gyroscope 406. In some embodiments, the power supply 402, the accelerometer 404 and the gyroscope 406 may each be arranged in or otherwise associated with the casing collar 116, such as being arranged within the cavity 122 (FIG. 1) of the casing collar 116.

The intelligence system 400 may further be associated with the cement wiper plug 118, which includes the power supply 128, the computer hardware 130, and the pulser 132, as generally described above. In some embodiments, the power supply 402 of the casing collar 116 may power the computer hardware 130. In other embodiments, however, the power supply 128 of the cement wiper plug 118 provides power to the computer hardware 130, as described above. The power supply 128 also provides power to the pulser 132.

The accelerometers 404 and gyroscopes 406 may be configured to communicate with the computer hardware 130 via an interface 408 and thereby provide the inputs for the computer hardware 130. The computer hardware 130 may receive such data and determine the proper orientation of the downhole equipment at issue with respect to the Earth's gravity. Once the proper orientation is determined, this data may be sent to the pulser 132, which transmits the data to the surface 104 via pressure pulses. The computer system 140 (FIG. 1) at the surface 104 may receive and translate the pressure pulses into data that the well operator can consider and thereby make any needed orientation adjustments of the casing string 110.

Embodiments disclosed herein include:

A. A well system that includes a casing string extending from a surface location within a wellbore, an annulus being defined between the casing string and the wellbore, a casing collar included in the casing string and having one or more sensors configured to measure at least one fluid property of a fluid present within the annulus, a cement wiper plug arranged within the casing string and communicably coupled to the casing collar such that measurement data obtained by the one or more sensors is conveyed to and received by the cement wiper plug, and a pulser included in the cement wiper plug and configured to transmit pressure pulses to the surface location, wherein the pressure pulses correspond to the measurement data received from the one or more sensors.

B. A method including arranging a casing string extending within a wellbore extending from a surface location, an annulus being defined between the casing string and the wellbore, measuring at least one fluid property of a fluid present within the annulus using one or more sensors associated with a casing collar included in the casing string, receiving measurement data obtained by the one or more sensors with a cement wiper plug arranged within the casing string and communicably coupled to the casing collar, and transmitting the measurement data to the surface location in the form of pressure pulses with a pulser associated with the cement wiper plug.

C. A method including arranging a casing string extending from a surface location within a wellbore, an annulus being defined between the casing string and the wellbore and one or more casing collars being arranged about the casing string along a length of the casing string, circulating a fluid through the casing string and the annulus, and measuring a fluid property of the fluid in the annulus with sensors associated with the one or more casing collars and thereby obtaining measurement data, wherein the fluid property comprises at least one of pressure, temperature, density, viscosity, pH, chemical composition, gas-cut, and presence of oil and/or gas within the fluid.

Each of embodiments A, B, and C may have one or more of the following additional elements in any combination: Element 1: wherein the one or more sensors comprise a sensor selected from the group consisting of a temperature sensor, a pressure sensor, a strain gauge or sensor, a pH sensor, a density sensor, a viscosity sensor, a chemical composition sensor, an accelerometer, a gyroscope, magnetometer, a radiation sensor, an acoustic transponder, a sonic sensor, a mechanical sensor, a self/spontaneous potential sensor, and a nuclear detector or sensor. Element 2: wherein the casing collar further includes a communications module communicably coupled to the one or more sensors and configured to convey the measurement data to the cement wiper plug. Element 3: wherein the cement wiper plug further includes computer hardware communicably coupled to the pulser and configured to receive the measurement data from the communications module and operate the pulser in response thereto. Element 4: wherein the one or more sensors are spaced about a circumference of the casing string and configured to monitor the at least one fluid property of the fluid at a plurality of angles about the casing string. Element 5: wherein the fluid is at least one of a drilling fluid, a spacer fluid, a cement slurry, water, oil, petroleum, an emulsion of oil and water, and a formation fluid. Element 6 wherein the at least one fluid property of the fluid comprises a property selected from the group consisting of pressure, temperature, density, viscosity, pH, chemical composition, gas-cut, and presence of oil, formation water, salinity, radioactive tracers, salinity and nitride tracers, and/or gas within the fluid.

Element 7: wherein the fluid is at least one of a drilling fluid, a spacer fluid, a cement slurry, water, oil, petroleum, an emulsion of oil and water, and a formation fluid, and wherein measuring the at least one fluid property further comprises measuring at least one of pressure, temperature, density, viscosity, pH, chemical composition, gas-cut, and presence of oil, and/or formation water, salinity, radioactive tracers, salinity and nitride tracers, and/or gas within the fluid. Element 8: further comprising conveying the measurement data to the cement wiper plug using a communications module included in the casing collar and communicably coupled to the one or more sensors, and wherein transmitting the measurement data comprises operating the pulser to send the pressure pulses. Element 9: wherein the measurement data from the communications module is received with computer hardware included in the cement wiper plug, and wherein transmitting the measurement data further comprises sending a command signal to the pulser with the computer hardware. Element 10: further comprising receiving the pressure pulses with one or more surface sensors at the surface location, and translating the pressure pulses with a computer system communicably coupled to the one or more surface sensors. Element 11: wherein the fluid is drilling fluid, the method further comprising circulating a spacer fluid into the casing string and the annulus following circulation of the drilling fluid, measuring at least one fluid property of the spacer fluid in the annulus using the one or more sensors, receiving spacer fluid measurement data obtained by the one or more sensors with the cement wiper plug, transmitting the spacer fluid measurement data to the surface location with the pulser, and determining a volume of cement slurry required in the annulus by comparing the measurement data of the drilling fluid with the spacer fluid measurement data. Element 12: wherein measuring the at least one fluid property of the spacer fluid comprises measuring at least one of pressure, temperature, density, viscosity, pH, chemical composition, gas-cut, and presence of oil and/or gas within the spacer fluid. Element 13: wherein measuring the at least one fluid property of the spacer fluid further comprises stopping circulation of the spacer fluid after the spacer fluid is detected by the one or more sensors, and monitoring a property of the spacer fluid within the annulus while circulation is stopped and thereby determining whether the spacer fluid is being lost into a surrounding formation. Element 14: wherein the fluid is foam cement, and wherein measuring the at least one fluid property of the fluid further comprises measuring at least one of a quantity of a gas suspended in the foam cement, a quality of the gas suspended in the foam cement, and a density of the foam cement.

Element 15: further comprising storing the measurement data in a memory associated with the one or more casing collars, and downloading the measurement data to one of a logging tool or a bottom hole assembly introduced into the casing string following a cementing operation. Element 16: further comprising transmitting measurement data corresponding to the fluid property of the fluid to the surface location with a communications module included in at least one of the one or more casing collars. Element 17: wherein the sensors associated with at least one of the one or more casing collars are spaced about a circumference of the casing string, the method further comprising monitoring the fluid property of the fluid within the annulus at a plurality of angles about the casing string. Element 18: wherein the fluid property being measured by the sensors is pressure in the annulus, the method further comprising opening a check valve associated with at least one of the one or more sensors when the pressure in the annulus exceeds a predetermined limit, venting fluid pressure into the casing string through the check valve, and closing the check valve once the pressure in the annulus decreases below the predetermined level.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below.

It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A well system, comprising: a casing string extending from a surface location within a wellbore, an annulus being defined between the casing string and the wellbore; a casing collar included in the casing string and having one or more sensors configured to measure at least one fluid property of a fluid present within the annulus; a cement wiper plug, comprising a flow path defined therethrough, arranged within the casing string and communicably coupled to the casing collar such that measurement data of the measured fluid property obtained by the one or more sensors is conveyed to and received by the cement wiper plug; and a pulser included in the cement wiper plug and comprising a rocker arm configured to be actuated into the flow path by a controller in order to transmit pressure pulses corresponding to the measured fluid property to the surface location.

2. The well system of claim 1, wherein the one or more sensors comprise a sensor selected from the group consisting of a temperature sensor, a pressure sensor, a strain gauge or sensor, a pH sensor, a density sensor, a viscosity sensor, a chemical composition sensor, an accelerometer, a gyroscope, magnetometer, a radiation sensor, an acoustic transponder, a sonic sensor, a mechanical sensor, a self/spontaneous potential sensor, and a nuclear detector or sensor.

3. The well system of claim 1, wherein the casing collar further includes a communications module communicably coupled to the one or more sensors and configured to convey the measurement data to the cement wiper plug.

4. The well system of claim 3, wherein the controller is disposed in the cement wiper plug and includes computer hardware communicably coupled to the pulser and configured to receive the measurement data from the communications module and actuate the rocker arm in response thereto.

5. The well system of claim 1, wherein the one or more sensors are spaced about a circumference of the casing string and configured to monitor the at least one fluid property of the fluid at a plurality of angles about the casing string.

6. The well system of claim 1, wherein the fluid is at least one of a drilling fluid, a spacer fluid, a cement slurry, water, oil, petroleum, an emulsion of oil and water, and a formation fluid.

7. The well system of claim 6, wherein the at least one fluid property of the fluid comprises a property selected from the group consisting of pressure, temperature, density, viscosity, pH, chemical composition, gas-cut, and presence of oil, formation water, salinity, radioactive tracers, salinity and nitride tracers, and/or gas within the fluid.

8. A method, comprising:
arranging a casing string extending within a wellbore extending from a surface location, an annulus being defined between the casing string and the wellbore;
measuring at least one fluid property of a fluid present within the annulus using one or more sensors associated with a casing collar included in the casing string;
receiving measurement data of the at least one fluid property obtained by the one or more sensors with a cement wiper plug comprising a flow path defined therethrough, the cement wiper plug arranged within the casing string and communicably coupled to the casing collar; and
transmitting the measurement data to the surface location as pressure pulses generated through actuation, by a controller, of a rocker arm of a pulser associated with the cement wiper plug into the flow path.

9. The method of claim 8, wherein the fluid is at least one of a drilling fluid, a spacer fluid, a cement slurry, water, oil, petroleum, an emulsion of oil and water, and a formation fluid, and wherein measuring the at least one fluid property further comprises measuring at least one of pressure, temperature, density, viscosity, pH, chemical composition, gas-cut, and presence of oil, and/or formation water, salinity, radioactive tracers, salinity and nitride tracers, and/or gas within the fluid.

10. The method of claim 8, further comprising conveying the measurement data to the cement wiper plug using a communications module included in the casing collar and communicably coupled to the one or more sensors, and wherein transmitting the measurement data comprises operating the pulser to send the pressure pulses.

11. The method of claim 10, wherein the measurement data from the communications module is received with computer hardware of the controller included in the cement wiper plug, and wherein transmitting the measurement data further comprises sending a command signal to the pulser with the computer hardware.

12. The method of claim 10, further comprising:
receiving the pressure pulses with one or more surface sensors at the surface location; and
translating the pressure pulses with a computer system communicably coupled to the one or more surface sensors.

13. The method of claim 8, wherein the fluid is drilling fluid, the method further comprising:
circulating a spacer fluid into the casing string and the annulus following circulation of the drilling fluid;
measuring at least one fluid property of the spacer fluid in the annulus using the one or more sensors;
receiving spacer fluid measurement data obtained by the one or more sensors with the cement wiper plug;
transmitting the spacer fluid measurement data to the surface location with the pulses; and
determining a volume of cement slurry required in the annulus by comparing the measurement data of the drilling fluid with the spacer fluid measurement data.

14. The method of claim 13, wherein measuring the at least one fluid property of the spacer fluid comprises measuring at least one of pressure, temperature, density, viscosity, pH, chemical composition, gas-cut, and presence of oil and/or gas within the spacer fluid.

15. The method of claim 13, wherein measuring the at least one fluid property of the spacer fluid further comprises:
stopping circulation of the spacer fluid after the spacer fluid is detected by the one or more sensors; and
monitoring a property of the spacer fluid within the annulus while circulation is stopped and thereby determining whether the spacer fluid is being lost into a surrounding formation.

16. The method of claim 8, wherein the fluid is foam cement, and wherein measuring the at least one fluid property of the fluid further comprises measuring at least one of a quantity of a gas suspended in the foam cement, a quality of the gas suspended in the foam cement, and a density of the foam cement.

17. A method, comprising:
arranging a casing string extending from a surface location within a wellbore, an annulus being defined between the casing string and the wellbore and one or more casing collars being arranged about the casing string along a length of the casing string;
circulating a fluid through the casing string and the annulus;
measuring a fluid property of the fluid in the annulus with sensors associated with the one or more casing collars and thereby obtaining measurement data, wherein the fluid property comprises at least one of pressure, temperature, density, viscosity, pH, chemical composition, gas-cut, and presence of oil and/or gas within the fluid; and
actuating a rocker arm of a pulser into a flow path defined through a cement wiper plug arranged in the casing string, the rocker arm actuated by a controller based on the measurement data relating to the fluid property, and generating pressure pulses through the actuated rocker arm based on the measurement data.

18. The method of claim 17, further comprising:
storing the measurement data in a memory associated with the one or more casing collars; and
downloading the measurement data to one of a logging tool or a bottom hole assembly introduced into the casing string following a cementing operation.

19. The method of claim 17, further comprising transmitting measurement data corresponding to the fluid property of the fluid to the surface location with a communications module included in at least one of the one or more casing collars.

20. The method of claim 17, wherein the sensors associated with at least one of the one or more casing collars are spaced about a circumference of the casing string, the method further comprising monitoring the fluid property of the fluid within the annulus at a plurality of angles about the casing string.

21. The method of claim 17, wherein the fluid property being measured by the sensors is pressure in the annulus, the method further comprising:
opening a check valve associated with at least one of the sensors when the pressure in the annulus exceeds a predetermined limit;
venting fluid pressure into the casing string through the check valve; and
closing the check valve once the pressure in the annulus decreases below the predetermined limit.

\* \* \* \* \*

UNITED STATES PATENT AND TRADEMARK OFFICE
CERTIFICATE OF CORRECTION

PATENT NO. : 9,896,926 B2  
APPLICATION NO. : 14/382623  
DATED : February 20, 2018  
INVENTOR(S) : David Joe Steele Page 1 of 1

It is certified that error appears in the above-identified patent and that said Letters Patent is hereby corrected as shown below:

In the Claims

In Column 18, Line 23:
Replace "pulses", with --pulser--.

Signed and Sealed this
Twenty-ninth Day of May, 2018

Andrei Iancu
*Director of the United States Patent and Trademark Office*